Aug. 25, 1953 C. BOCKIUS 2,649,992
ARTICLE STORING AND DISPENSING APPARATUS
Filed March 22, 1947 4 Sheets-Sheet 1

INVENTOR
CHRISTOPHER BOCKIUS
BY
ATTORNEY

Aug. 25, 1953 C. BOCKIUS 2,649,992
ARTICLE STORING AND DISPENSING APPARATUS
Filed March 22, 1947 4 Sheets-Sheet 4

INVENTOR
CHRISTOPHER BOCKIUS
BY
ATTORNEY

Patented Aug. 25, 1953

2,649,992

UNITED STATES PATENT OFFICE 2,649,992

ARTICLE STORING AND DISPENSING APPARATUS

Christopher Bockius, Ridgewood, N. J., assignor to American Machine and Foundry Company, a corporation of New Jersey Application March 22, 1947, Serial No. 736,479

4 Claims. (Cl. 220—93)

The present invention relates to automatic apparatus for storing and dispensing heavy articles, such as machine parts, which are in the process of manufacture.

In manufacturing, it is frequently necessary to put a large number of similar metallic parts through a succession of manufacturing operations. To accomplish this, many manufacturing establishments employ tote boxes or trays which are lifted by an employee onto a small hand truck to move them from one station to the next.

This practice of using tote boxes not only consumes time but it also causes fatigue on the part of the worker. There is also the possibility that workers might injure themselves when lifting tote boxes which are sometimes quite heavy. Accidents might also result if these boxes were dropped when being placed on or removed from the truck.

It is the purpose of my invention to provide a material handling apparatus which will not only overcome the disadvantages mentioned, but which will also save storage space, minimize fatigue on the part of workers, and increase efficiency in the handling and transferring of material from one station to another.

Another object of my invention is to provide an industrial material handling apparatus which can store, carry and dispense unstacked material weighing as much as 1,000 lbs. without subdividing the load into smaller units while maintaining the top of the unstacked material at a constant predetermined level.

Another object is to provide a material handling apparatus for storing, conveying and dispensing small heavy parts without requiring the use of trays or tote boxes.

A further object is to provide material handling apparatus which will have an automatic elevating table enclosed within a shell which supports unstacked articles, carried by the table, against lateral displacement.

A further object of my invention is to provide an industrial material handling apparatus which will dispense with the need for workers lifting or lowering material to be worked on and thereby conserve their energies for more productive work.

Another object is to provide a booster for an automatic self-leveling material storing and dispensing apparatus which will overcome any friction existing between unstacked material carried by an elevating platform and an inner shell which confines this material from lateral displacement.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
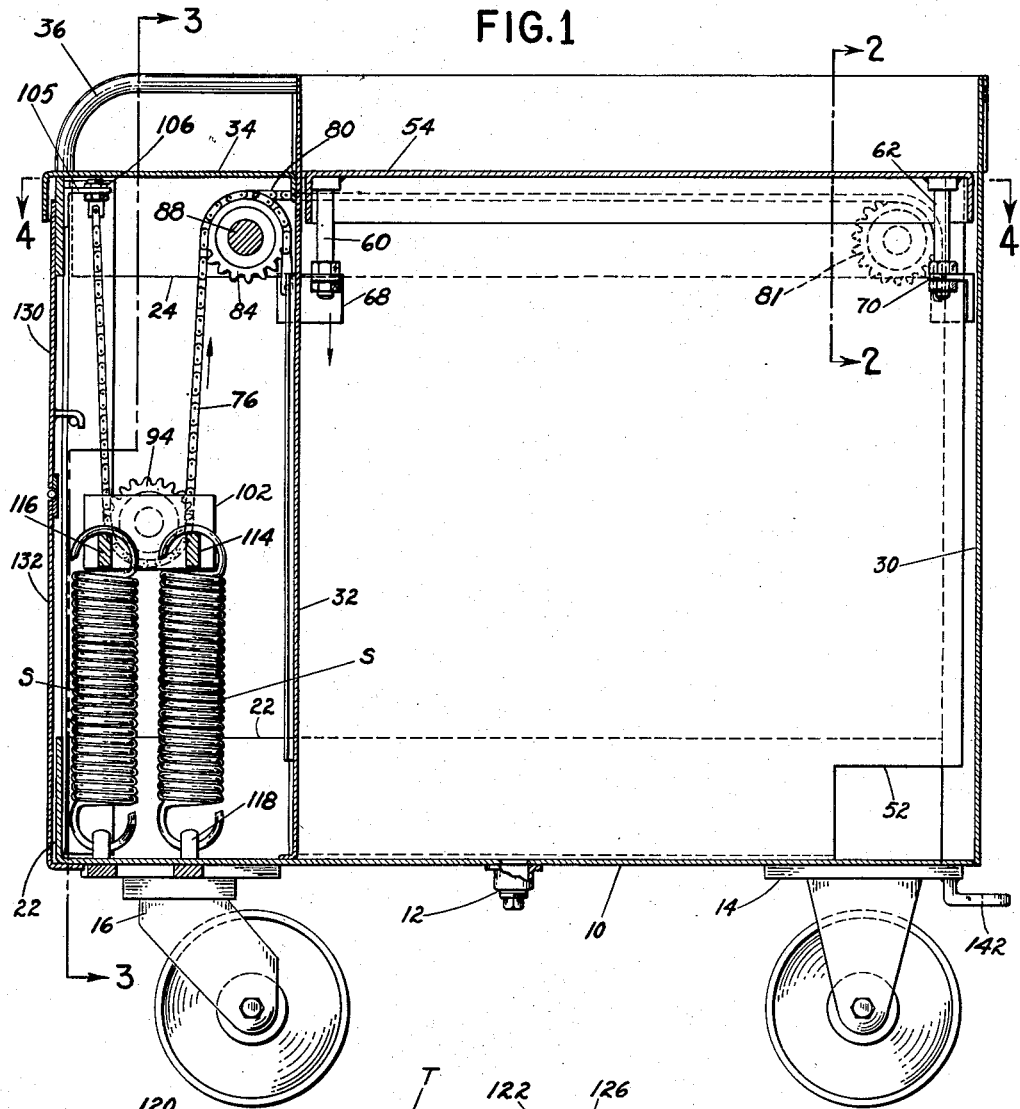
Fig. 1 is a cross sectional side elevation taken on line 1—1 of Fig. 3.
Figure 2:
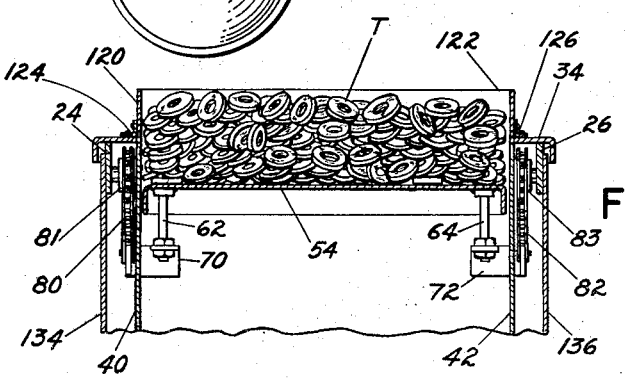
Fig. 2 is a cross sectional end elevation taken on line 2—2 of Fig. 1.

Referring to Figures 1 and 2 of the drawings, I have provided a bottom plate 10 having a drain plug 12. Affixed to the bottom plate 10 are two stationary casters 14 and two swivel casters 16. The sides of the bottom plate 10 are bent upwardly to form an enclosed water-tight drain pan for collecting any liquids which may drip from the articles being carried by the material handling apparatus. At the rear of the tote box, in each corner, are two upright angle irons 18 and 20 which are secured at the bottom by suitable means, such as welding, to the upwardly bent sides 22 of the bottom plate 10.

Figure 4:
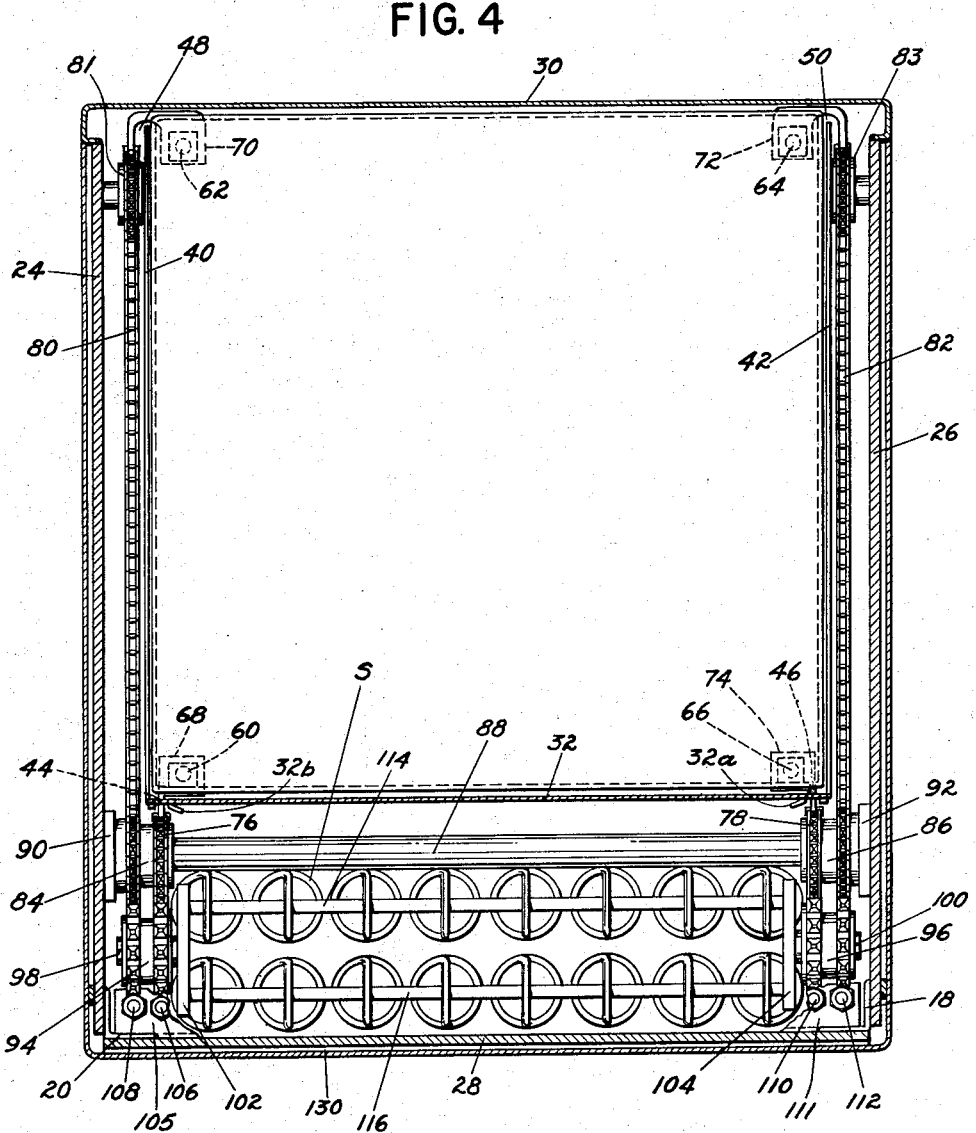
Fig. 4 is a cross sectional top elevation taken on line 4—4 of Fig. 1.

Secured to the upper ends of the upright angle irons 18 and 20 are three cross bars 24, 26 and 28, as shown in Fig. 4. The front end of the automatic material handling apparatus has a plate 30 which is secured at its lower end, by welding, to the bottom plate 10 and is secured at its upper end to the flat bars 24 and 26 by welding.

At the rear end of the material handling apparatus is an inner shell 32 which is secured at its lower end to the bottom plate 10 by welding and is secured at its upper end to the top plate 34 by welding (Fig. 1). The vertical sides of inner shell 32 are made rigid by bending the edge to form small sharp angles 32a and 32b, as shown in Fig. 4.

The top cover plate 34, over the top of the material handling apparatus, is secured to the bars 24, 26, 28 and to the outer and inner shell 30 by welding. Suitable handles 36 and 38, connected between the upper portion of inner shell plate 32 and the top plate 34 by welding, are provided for moving the material handling apparatus about. Inner shell plates 40 and 42 are provided on each side of the apparatus and are secured at their lower end to the bottom plate 10 and at their upper end to the top cover plate 34.

As shown in Fig. 4, vertically extending slits 44 and 46 are provided between the inner shell 32 and the inner shells 40 and 42 respectively. Similar type vertically extending slits 48 and 50 (Fig. 4) are provided between the inner shells 40 and 42 and the inner and outer shell 30.

The lower forward side of each inner shell 40 and 42 is provided with cut out hand holes 52 (Fig. 1) to permit the forward end of the reciprocating table or carrier 54 to be adjusted. Similar hand holes 56 and 58 (Fig. 3) are provided on opposite sides of the lower portion of inner shell 32 to permit the rear end of the table 54 to be adjusted so that it will be horizontal. The table or carrier 54 has four bolts 60, 62, 64 and 66 welded in each corner to its under side. The lower end of each bolt is adjustably supported in suitable brackets 68, 70, 72 and 74, as shown in Figs. 1 and 4, and can be adjusted through the hand holes 52, 56 and 58.

Non-stretching elongated flexible members, such as sprocket chains 76, 78, 80 and 82, are provided for supporting the table or carrier 54. Sprocket chains 76 and 78 are connected at one end to brackets 68 and 74. Sprocket chains 80 and 82, passing over sprockets 81 and 83, are connected at one end to brackets 70 and 72 respectively. The sprockets 81 and 83 are connected to the flat bars 24 and 26. A pair of double sprockets 84 and 86 are fixedly mounted on opposite ends of shaft 88. Shaft 88 is freely mounted in bearing housings 90 and 92, which, in turn, are fixedly secured to the upper flat bars 24 and 26. A second pair of double sprockets 94 and 96 are freely mounted on studs 98 and 100. The studs 98 and 100 are carried by the saddle plates 102 and 104.

The sprocket chains 76, 80 and 78, 82, which pass over the double sprockets 84 and 86 and under the double sprockets 94 and 96, are connected at their opposite ends to sprocket chain studs 106, 108, 110 and 112 respectively. The sprocket chain studs are adjustably mounted in brackets 105 and 111. A pair of spring shafts 114 and 116 are supported at their opposite ends in saddle plates 102 and 104.

Mounted on these shafts 114 and 116 are a plurality of calibrated tension springs S. These springs are calibrated to stretch a given equal distance for each given increment of pulling force exerted on the spring. The lower end of the calibrated tension springs S is removably connected to hooks 118 which are fixedly attached to the bottom plate 10.

A pair of drop flaps 120 and 122 are connected to either side of top plate 34 by means of piano hinges 124 and 126. Suitable hooks 128, mounted on the upper side of inner and outer shells 30 and 32, are provided for holding the drop flaps 120 and 122 vertical. The rear end of the tote box rack is enclosed by a removable cover plate 130 which has a hinged section 132 that can swing outwardly and upwardly to permit the calibrated tension springs S to be hooked and unhooked for supporting loads of different weights.

When the desired number of calibrated springs S are connected for supporting a given weight of material, the table 54 will descend or ascend a given distance for each additional increment or decrement to the load supported by the table 54.

Due to this arrangement, the uppermost part of the material carried by the table 54 is always maintained at a constant predetermined level. Fig. 2 shows how the uppermost part T of the material, supported on the table 54, rises a short distance above the top cover plate 34 of the apparatus and is confined laterally by the inner shell plates 30, 32, 40 and 42 and the drop flaps 120 and 122 which project above the top cover 34.

Figure 3:
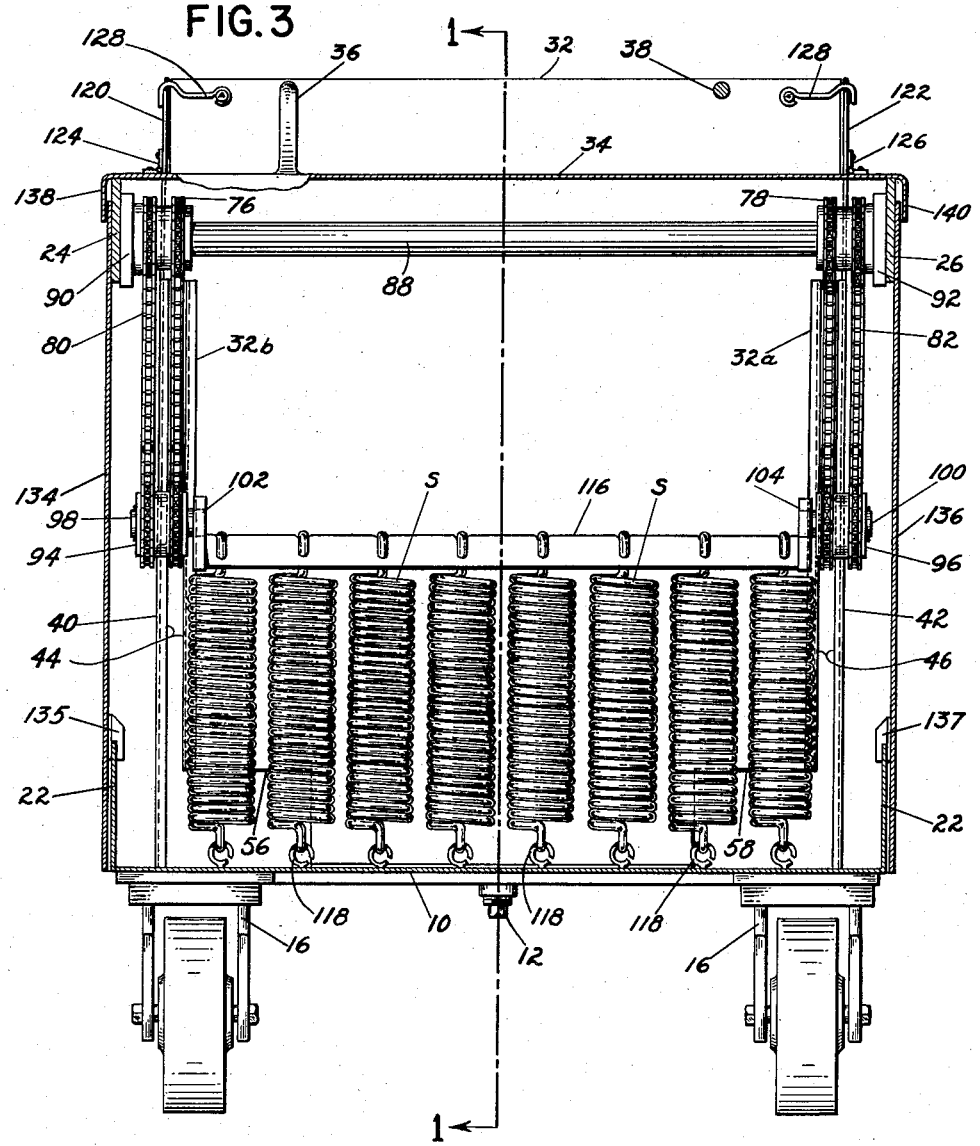
Fig. 3 is a cross sectional end elevation taken on line 3—3 of Fig. 1.

The cover plate 130 (Fig. 1) which is held in place by suitable hangers, may be removed from the material handling apparatus by lifting the same upwardly and then outwardly at the bottom. Cover plates 134 and 136 enclose the sides of the apparatus (Fig. 3) and are removed in a similar manner by first lifting them upwardly under the flanges 138 and 140 of the top plate 34 and then outwardly at the bottom. When the plates 134 and 136 are replaced on the apparatus, suitable hangers 135 and 137 hold the plates in place as shown in Fig. 3. Cover plates 134 and 136 provide the apparatus with a flat safe exterior and their manner of mounting facilitates cleaning the inside of the apparatus.

A conventional hitch 142, attached to the bottom plate 10, is provided to facilitate moving the apparatus from one position to another by mechanical means.

When storing and dispensing certain types of material with my apparatus, it may be found that the load is sometimes not maintained at a predetermined level due to friction between the unstacked material and the inner shell which supports the material laterally. This temporary stoppage, if it occurs, can sometimes be easily overcome by manually pressing the load downwardly and then releasing it suddenly.

Figure 5:
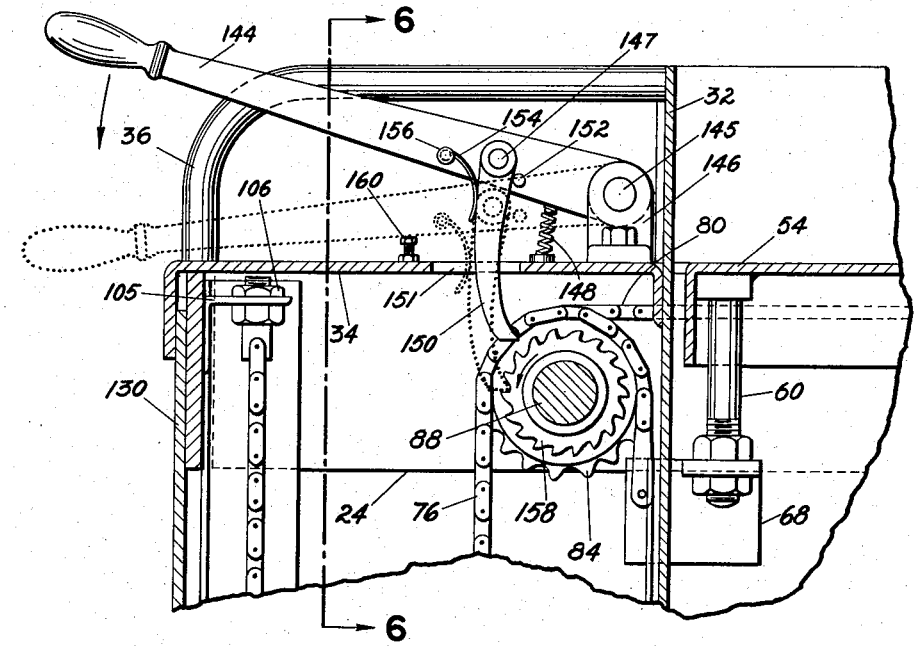
Fig. 5 is a partial cross sectional side elevation of a modified form of my invention.
Figure 6:
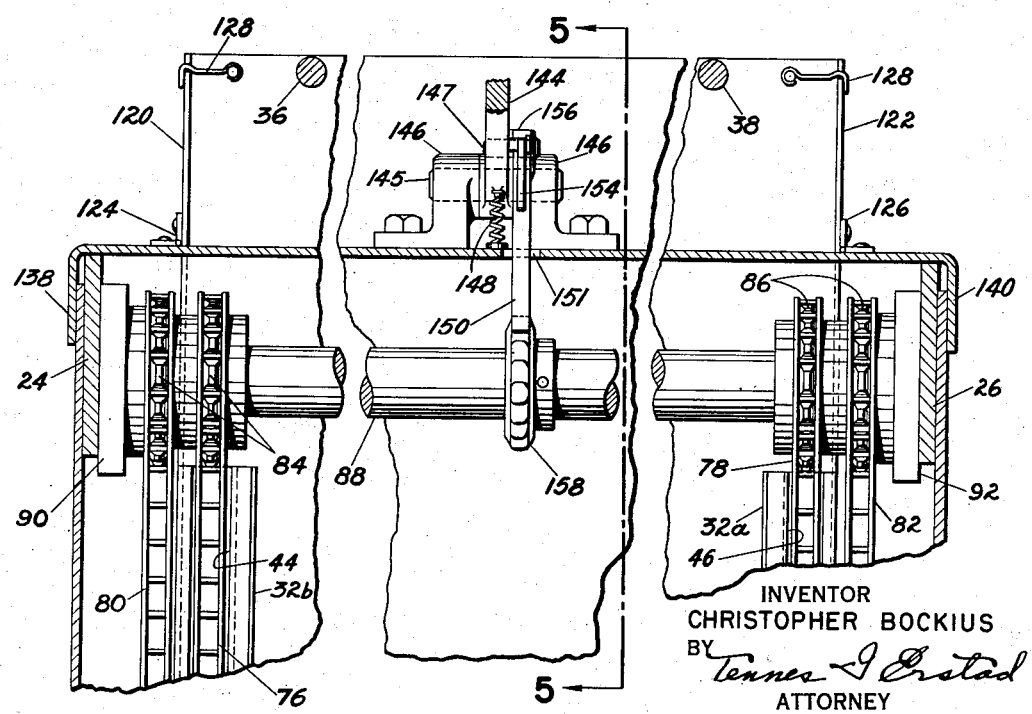
Fig. 6 is a partial cross sectional end elevation of the apparatus shown in Fig. 5.

If desired, a manually operated booster mechanism may be used, such as illustrated in Figs. 5 and 6. This mechanism consists of a hand lever 144 which is pivoted to a stud 145 held by a pair of suitable brackets 146 mounted to the top cover plate 34. Said hand lever 144, by means of a stud 147, carries a pawl 150 which extends downward through a slot 151 in top cover plate 34. Pawl 150 is normally held against a stop pin 152 extending from hand lever 144 by a tension spring 154 which, by means of a stud 156, is anchored to hand lever 144. A ratchet 158 is mounted directly beneath the pawl 150 on the same shaft 88 which carries double sprockets 84 and 86. A spring 148, anchored to the top cover plate 34, presses with its upper end against the hand lever 144 and maintains it normally in its uppermost position. This, in turn, keeps pawl 150 out of engagement and contact with ratchet 158.

The booster mechanism is provided for the purpose of overcoming any temporary wedging of the unstacked material T on carrier table 54 against the inner walls of shells 30 and 32 in order to maintain the top level of the material T at its predetermined constant level. Therefore, the booster mechanism is only operated when necessary to assist the calibrated springs S in maintaining the material T at said predetermined constant level.

Should the operator notice that the top surface of the mass of the material does not remain at the predetermined constant level, he depresses the hand lever 144 in the direction of the arrow in Fig. 5, thereby effecting an engagement of pawl 150 with ratchet 158 and causing the ratchet to turn several degrees in the direction of the arrow. The turning of ratchet 158, of course, effects a turning of shaft 88 and the double sprockets 84 and 86 mounted thereon which, through chains 76, 78, 80 and 82, cause an upward movement of the carrier table 54, thus overcoming temporary friction caused by the material T rubbing against the inner walls of shells 30 and 32 and assisting springs S to regain their normal function. An adjustable stud 160, secured to top cover plate 34, is provided for arresting the downward movement of hand lever 144. Upon releasing said hand lever, the latter, due to the action of spring 148, resumes its normal uppermost position thereby releasing pawl 150 from engagement and contact with ratchet 158. While I have shown one type of mechanism for overcoming any frictional hesitations of my stacking device, there are many other devices for rotating or moving a member in one direction while permitting the member to travel freely when not actuated which could be substituted for this structure. Examples of such structures would be one way ball clutches, fluid piston pumps, ratchets, etc., and the scope of the claims in this application is intended to cover such variations, whether actuated by a hand lever or a foot pedal.

The operation of my apparatus may be briefly described as follows:

When items to be stored are piled on the reciprocating table or carrier 54, the carrier 54 descends a distance which is directly proportional to the weight of the material added to the carrier table 54 so that the top of the material T (Fig. 2) will be substantially level with the upper edge of the inner and outer shells 30, 32 and drop flaps 120 and 122.

If the material is of light weight, it may be necessary to disconnect some of the oppositely disposed calibrated springs S until the spring tension is in balance with the weight of the material to be supported. This is accomplished by unhooking a suffificient number of oppositely disposed springs from the hooks 118 until the top of the material T is level with the inner shells 30 and 32 and the drop flaps 120 and 122 as shown in Fig. 2. Thereafter, each increment or decrement added to or removed from the load, carried by the table 54, will cause a proportional lowering or raising of the entire load carried by the table so that the top of the load T will, at all times, be maintained at a predetermined level.

The brackets 68, 70, 72 and 74, which support the carrier table 54, reciprocate vertically in the slits 44, 46, 48 and 50 as material is removed from or added to the table 54. It will be noted that the springs S travel only half the distance that the carrier table 54 travels and that by doubling the springs in the manner shown in Figs. 1 and 4, I have provided a very compact material handling apparatus that can carry, without difficulty, loads ranging from 800 to 1,000 pounds. As the amount of material placed on the table 54 is increased or decreased, the inner shell, formed by the shell plates 32, 40 and 42 and the front plate 30, supports the load laterally as the table 54 goes up and down. When the carrier table 54 is in its uppermost elevated position, the brackets 68, 70, 72 and 74 engage with suitable stops formed by part of the inner shell extending across the slits 44, 46, 48 and 50 so that the carrier table 54 will be level with the top plate 34. In this position, the load resting on the table 54 is supported laterally by means of the upper projecting inner and outer shell 30 and the inner shell plate 32 and by the drop flaps 120 and 122.

When the material handling apparatus has been placed at the location where it is to be either loaded or emptied, one or both of the flaps 120 and 122 are dropped to permit ready access to the material.

No lifting or lowering movements by an operator are necessary to either load or unload the apparatus. All of the lifting or lowering is accomplished by the calibrated spring supporting table 54. An operator only has to move the material in a horizontal direction. As a result, the energy of the operator is conserved and can be used for more productive purposes.

Material that is to be carried in the apparatus described often has a coolant or other liquid associated with the material. To avoid having this liquid drip on the floor, I have made the bottom pan, consisting of the bottom plate 10 and the upwardly extending projections associated with the sides of the plate 10, water tight. A drain plug 12 has been provided for removing accumulated fluid from the drain pan from time to time.

Due to the fact that the inner shell provides lateral support for the load carried by the table 54, it is not necessary to employ tote boxes and a considerable saving on storage space results. By eliminating the need for using tote boxes, I have also accomplished the object of providing a material handling apparatus which decreases fatigue on the part of a worker due to the fact that he does not have to lift and lower tote boxes which used to weigh from 50 to 100 pounds.

The invention above described may be varied in construction within the scope of the claims, for the particular device selected to illustrate the invention is but one of many possible embodiments of the same. The invention, therefore, is not to be restricted to the precise details of the structure shown and described.

What is claimed is:

1. Apparatus for storing, handling and dispensing material in the process of manufacture comprising, a frame having upper and lower horizontal plates, a platform movable within said frame between a position substantially in the same plane as the upper horizontal plate and the position of the lower horizontal plate, calibrated tension springs secured at one end to said frame, elongated flexible members having one end connected to said platform and the other end actuated by said tension springs to move said platform a distance directly proportional to the weight of the material placed on said platform, guides over which said flexible members travel, an inflexible confining guide wall surrounding said platform on all sides for laterally supporting material placed on said platform while allowing material supported thereon to have free unrestricted upward movement, the upper end portion of at least one side of the confining guide wall being pivoted on a horizontal axis to said upper horizontal plate to permit it to be moved from a vertical to a horizontal position to facilitate the removal and placement of material on said table platform, a manually operable member secured to said apparatus for manually displacing said platform, and means interconnecting said manually operable member with said guides for manually displacing the platform whenever friction between the material on the platform and the inflexible confining guide wall interferes with the counterbalancing force exerted by the calibrated tension springs on the platform and the material supported thereon.

2. Apparatus for storing, handling and dispensing material comprising, a frame having upper and lower horizontal plates, a material supporting platform, elongated flexible members connected at one end to said platform for movement between said upper and lower horizontal plates to support the platform, calibrated tension springs interconnected with said elongated flexible members to exert a counterbalancing force thereon directly proportional to the distance traveled by said platform for vertical movement within said frame, inflexible confining walls surrounding said platform on all sides for laterally supporting material carried by said platform while allowing said material to have free unrestricted upward movement, said confining wall extending above the uppermost limit of travel of said platform, and the upper end portion of at least one side of said confining wall being horizontally pivoted to said upper plate substantially in the plane of the upper limit of travel of said platform, said upper end portion being movable from a vertical to a horizontal position to permit material to be placed on and removed from said platform in a horizontal direction.

3. Apparatus for storing, transporting and dispensing items of material in the process of manufacture comprising, a frame having upper and lower horizontal supporting plates, a platform mounted for vertical movement within said frame between a portion substantially in the same plane as the upper horizontal plate and the lower horizontal plate, sprocket chains extending along opposite sides of and connected to and supporting said platform, spaced sets of sprockets over which said sprocket chains pass, chain anchors connecting said frame to the opposite end of said sprocket chains, a shaft interconnecting all of said spaced sets of sprockets, a loop formed in said chains between said spaced sets of sprockets and said chain anchors, a second set of spaced sprockets supported by said loops, spaced shafts in said last named spaced sets of sprockets, a saddle carried by each shaft, said saddles being interconnected by spaced parallel bars, spring anchors connected to said frame below said shafts, two spaced closely adjacent rows of calibrated tension springs, each of said springs being connected at one end to said shafts and at their other end to said spring anchors for counterbalancing the weight of material supported on said platform, said springs and anchors being spaced from each other a distance sufficient to prevent the rows of springs from touching each other while being extended and contracted, and an inflexible confining guide wall surrounding said platform on all sides for laterally supporting material placed on said platform while allowing material supported thereon to have free unrestricted upward movement, the upper end portion of at least one side of the confining guide wall being pivoted on a horizontal axis to said upper horizontal plate to permit it to be moved from a vertical to a horizontal position to facilitate the removal and placement of material on said table platform.

4. Apparatus of the self leveling type for storing and dispensing material wherein the top of the material stored in said apparatus is automatically maintained at a constant level, said apparatus comprising a frame having upper and lower horizontal plates, a rectangular platform, vertical walls positioned closely adjacent each side of said rectangular platform for laterally supporting material placed on said platform, said walls extending above the upper horizontal plate, the upper end portion of at least one side of said confining wall being horizontally pivoted to said upper plate substantially in the plane of the upper limit of travel of said platform, said upper end portion being movable from a vertical to a horizontal position to permit material to be placed on and removed from said platform in a horizontal direction, automatic means for moving said platform vertically a distance varying with the amount of material supported thereon, said automatic means including, elongated flexible members for supporting said platform for vertical movement, calibrated tension springs connected to said elongated flexible members for supporting and counterbalancing the weight of material placed on said platform to maintain the top of the material at a constant predetermined level, a lever mounted adjacent the top of said vertical walls, and means interconnecting said lever with said automatic means for manually displacing the platform whenever friction between material on said platform and the vertical sidewalls interferes with the counterbalancing force exerted by the tension springs on the platform and material supported thereon.

CHRISTOPHER BOCKIUS.

References Cited in the file of this patent

UNITED STATES PATENTS

| Number | Name | Date |
|---|---|---|
| 190,568 | Fitzhugh | May 8, 1877 |
| 399,197 | Hawkins | Mar. 5, 1889 |
| 416,042 | Smith | Nov. 26, 1889 |
| 722,166 | Taft | Mar. 3, 1903 |
| 1,280,413 | Cullen et al. | Oct. 1, 1918 |
| 1,306,132 | Upton | June 10, 1919 |
| 1,444,474 | McElroy | Feb. 6, 1923 |
| 1,833,208 | Davidson | Nov. 24, 1931 |
| 1,983,176 | Klomparens | Dec. 4, 1934 |
| 1,990,894 | Brubaker | Feb. 12, 1935 |
| 2,141,246 | Jacobus et al. | Dec. 27, 1938 |
| 2,251,873 | Gibbs | Aug. 5, 1941 |
| 2,251,875 | Gibbs | Aug. 5, 1941 |
| 2,330,432 | Fossati | Sept. 28, 1943 |
| 2,340,595 | Jones | Feb. 1, 1944 |
| 2,434,138 | Adams | Jan. 6, 1948 |
| 2,461,638 | Gibbs | Feb. 15, 1949 |
| 2,468,115 | Saul | Apr. 26, 1949 |